Figure 1:
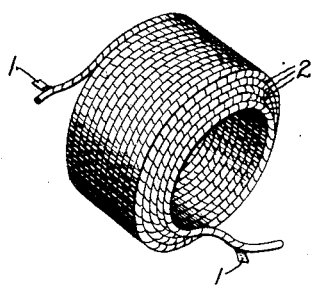

Aug. 30, 1932.  E. S. DAWSON, JR  1,874,723
ELECTRICAL COIL
Filed Sept. 18, 1931

Inventor:
Edward S. Dawson Jr,
by Charles E. Muller
His Attorney.

Patented Aug. 30, 1932

1,874,723

UNITED STATES PATENT OFFICE

EDWARD S. DAWSON, JR., OF SCHENECTADY, NEW YORK, ASSIGNOR TO GENERAL ELECTRIC COMPANY, A CORPORATION OF NEW YORK

ELECTRICAL COIL

Application filed September 18, 1931. Serial No. 563,682.

The present invention relates to electrical coils and is more particularly concerned with a novel method of producing a compact coil which possesses high dielectric strength, is completely resistant to moisture, oil, and weak acids, and through the insulation of which no dust or dirt can penetrate.

In constructing electrical coils according to certain methods generally followed at present there is ordinarily involved the use of such absorbent and fibrous materials as cotton, asbestos, and the like, which no matter how thoroughly dried previous to employment of the same always contain some moisture which renders the insulation more susceptible to break down during operation of the coil. Moreover in addition to such fibrous insulation various insulating varnishes are employed as well as certain types of treated tapes in order to complete the insulation of the coil.

In accordance with my invention I provide a simple method for effectively insulating a coil without the use of absorbent or fibrous materials or insulating varnishes and with a minimum amount of material and little labor. The method of my invention moreover produces a compact coil which is absolutely free from moisture and which is insulated with a material which because of the operations performed on it and its peculiar characteristics provides solid insulation which is impervious in character, and of high dielectric strength with small insulation space factor.

For a consideration of what is believed to be novel and the invention attention is directed to the following specification and the claims appended thereto.

Figure 2:
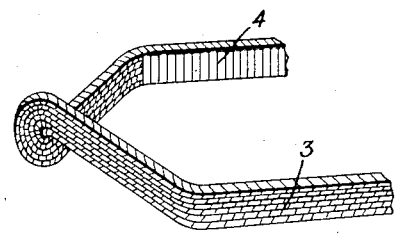

In the drawing accompanying and forming part of the present application,

Fig. 1 is a view in perspective of an electrical coil made in accordance with the present invention, Fig. 2 is a view in perspective of a portion of an induction motor field coil insulated in accordance with the present invention.

The insulation material employed in the present invention is a cellulose ester, such as cellulose acetate. This material is used in the form of thin dry sheets of, say, 3 mils or less in thickness. The cellulose acetate is applied to the conductors as a tape 1, for example, and the conductors formed into coils of the proper shape employing, if desired, additional cellulose acetate as layer insulation 2 between turns. The cellulose acetate is next rendered thermo-plastic by either internal baking, for example, by passing a suitable current through the conductors, or by molding in a steam heated mold for a short period of time at the proper temperature, for example, molding for about twenty minutes in a steam heated mold at a temperature of approximately 160° C. Such operation causes the cellulose acetate insulation to tightly shrink around the conductors and form into a solid mass. It is to be noted that no solvents are employed in the method; hence, the liability to early insulation break down under electrical stress from this source is completely eliminated. The heat treatment causes the cellulose acetate to form a solid completely impervious film on the conductors.

In forming such coils as induction motor field coils, for example, the cellulose acetate or similar ester may be spiralled in the form of dry thin sheets 3 on conductors. A coil is then formed and cemented together by proper heat treatment, for example, by steam molding. Additional cellulose acetate insulation is then applied to the slot portions as at 4 and shrunk on by steam molding. In this way a completely homogeneous insulation is applied with all the advantages enumerated above.

The cellulose acetate insulation may be caused to shrink around and solidify on the conductors by another form of heat treatment, instead of the heat treatments outlined above, by subjecting the coil having the cellulose acetate insulation thereon to the action of a high frequency field for a very short period of time, for example, a few seconds. The cellulose acetate is caused to form on the conductors the impervious solid insulation as explained above.

The solid insulation produced according to the present invention is particularly resistant to high temperatures and may be kept practically indefinitely at temperatures of approximately 150° C. The high dielectric strength of the cellulose ester is present in the coil which in addition is compact by virtue of the minimum amount of thin insulation employed. Since the insulation is dry and entirely impervious to foreign materials, such as dust, dirt, and the like, the life of the coil is materially enhanced.

What I claim as new and desire to secure by Letters Patent of the United States is:

1. The method of insulating an electrical coil which comprises providing the individual conductors of said coil with insulation comprising dry, thin films of cellulose ester and causing said cellulose ester to shrink around said conductors and form an impervious solid insulation thereon by applying heat to the coil.

2. The method of insulating an electrical coil which comprises providing the individual conductors of said coil with insulation comprising dry cellulose acetate and heating said coil under conditions whereby said cellulose acetate is caused to shrink around said conductors and to form an impervious solid insulation thereon.

3. The method of insulating an electrical coil which comprises applying to the conductors of said coil dry thin films of cellulose acetate and molding said coil under heat and pressure to convert the cellulose acetate thereon into a homogeneous impervious solid insulation.

4. The method of insulating an electrical coil which comprises spacing and covering the individual conductors of said coil with films of dry cellulose acetate 3 mils or less thick and converting the cellulose acetate into a solid homogeneous mass tightly adhering to said conductors and rigidly spacing them apart, by introducing said coil into a high frequency field for a few seconds.

In witness whereof, I have hereunto set my hand.

EDWARD S. DAWSON, Jr.